US010073229B2

(12) United States Patent
Ho et al.

(10) Patent No.: US 10,073,229 B2
(45) Date of Patent: Sep. 11, 2018

(54) TRANSMITTER OPTICAL SUBASSEMBLY (TOSA) MODULE WITH INTEGRATED WELDING MEMBER FOR USE IN OPTICAL TRANSMITTERS OR TRANSCEIVERS

(71) Applicant: Applied Optoelectronics, Inc., Sugar Land, TX (US)

(72) Inventors: I-Lung Ho, Sugar Land, TX (US); Chong Wang, Stafford, TX (US); YongXuan Liang, Stafford, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 0 days.

(21) Appl. No.: 15/334,753

(22) Filed: Oct. 26, 2016

(65) Prior Publication Data

US 2018/0172928 A1 Jun. 21, 2018

(51) Int. Cl.
*G02B 6/42* (2006.01)
*H04B 10/40* (2013.01)

(52) U.S. Cl.
CPC ......... *G02B 6/4246* (2013.01); *G02B 6/4256* (2013.01); *G02B 6/4281* (2013.01); *G02B 6/4292* (2013.01); *H04B 10/40* (2013.01)

(58) Field of Classification Search
None
See application file for complete search history.

(56) References Cited

U.S. PATENT DOCUMENTS

| 7,026,655 B2* | 4/2006 | Go | G02B 6/4201 257/80 |
| 8,104,977 B2 | 1/2012 | Sone et al. | |
| 8,340,522 B2* | 12/2012 | Yu | G02B 6/2706 398/41 |
| 2003/0223708 A1* | 12/2003 | Kurashima | G02B 6/4292 385/92 |
| 2007/0122154 A1* | 5/2007 | Nakanishi | G02B 6/4246 398/85 |
| 2014/0199032 A1* | 7/2014 | Lin | G02B 6/4228 385/92 |

OTHER PUBLICATIONS

International Search Report and Written Opinion from PCT/US17/58535, dated Nov. 28, 2017, 11 pgs.

* cited by examiner

*Primary Examiner* — Chad H Smith
(74) *Attorney, Agent, or Firm* — Grossman Tucker Perreault & Pfleger, PLLC; Norman S. Kinsella

(57) ABSTRACT

In accordance with an embodiment, a transmitter optical subassembly (TOSA) module is disclosed with a base portion that provides one or more mounting surfaces to mount a laser diode and associated driver circuitry in close proximity to allow for direct coupling without the use of an intermediate interconnect device, such as a flexible printed circuit or other interconnect device. The TOSA module base further includes a cylindrical shaped portion with a passageway extending therethrough. The substantially cylindrical shaped portion allows the TOSA module base to mount to a multi-channel TOSA housing via a Z-ring or other suitable welding ring without the use of an intermediate device such as a welding cap.

20 Claims, 6 Drawing Sheets

US 10,073,229 B2

TRANSMITTER OPTICAL SUBASSEMBLY (TOSA) MODULE WITH INTEGRATED WELDING MEMBER FOR USE IN OPTICAL TRANSMITTERS OR TRANSCEIVERS

TECHNICAL FIELD

The present disclosure relates to optical transmitters and transceivers, and more particularly, to a laser package with an integrated welding member for use in an optical transmitter or transceiver.

BACKGROUND INFORMATION

Optical transceivers are used to transmit and receive optical signals for various applications including, without limitation, internet data centers, cable TV broadband, and fiber to the home (FTTH) applications. Optical transceivers provide higher speeds and bandwidth over longer distances, for example, as compared to transmission over copper cables. The desire to provide higher speeds in smaller optical transceiver modules for a lower cost has presented challenges, for example, with respect to maintaining optical efficiency (power), thermal management, and manufacturing yield. Optical transceivers can include one or more transmitter optical subassemblies (TOSAs) and receiver optical subassemblies (ROSAs) for the purpose of transmitting and receiving optical signals. As channel density and increased speed becomes an increasingly important aspect of optical transceivers, the ability to scale-down while maintaining nominal transceiver performance raises numerous non-trivial challenges. Optical efficiency or power may be lost, for example, as a result of insertion loss and/or polarization dependent loss (PDL) caused by optical components in an optical transceiver.

BRIEF DESCRIPTION OF THE DRAWINGS

These and other features and advantages will be better understood by reading the following detailed description, taken together with the drawings wherein.

DETAILED DESCRIPTION

Figure 1:
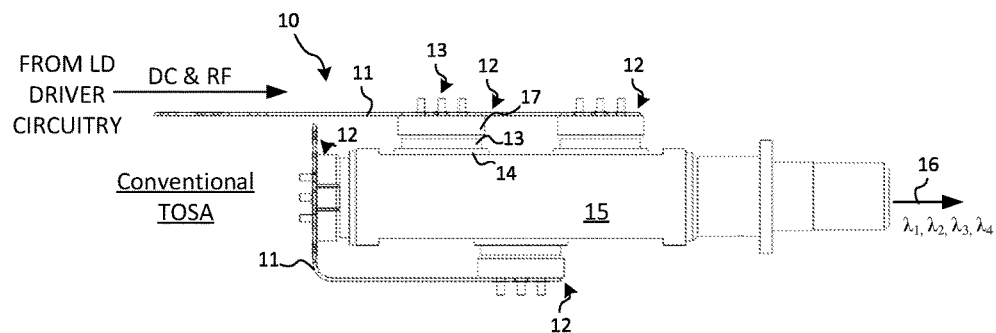
FIG. 1 is a side view of a multi-channel transmitter optical sub-assembly (TOSA)

Increased demand for high-speed optical transceivers, largely due to the adoption of network standards such as IEEE 802.3bm-2015 and others that prescribe 100 Gigabit Ethernet (100 GbE) and beyond, raises non-trivial challenges in the design of optical subassembly modules. For example, in multi-channel transmitter optical subassemblies (TOSAs) multiple optical component assemblies such as TO can laser assemblies may be coupled to openings of a TOSA housing to generate associated channel wavelengths. FIG. 1 shows one such example TOSA 10 having a plurality of TO can laser packages 12. Each of the TO can laser packages 12 emit light into the TOSA housing 15, with the TOSA housing 15 having an optical arrangement to combine channel wavelengths into an output wavelength division multiplexed (WDM) signal 16 for output via a waveguide or other device such as a fiber. Each of the TO can laser packages 12 may include a laser diode and associated optics (not shown) disposed in a hermetically or non-hermetically sealed package 17, or TO can header 17. Pins 13 of each TO can laser package 12 electrically couple to laser diode (LD) driver circuitry via flexible printed circuit boards (FPCs) 11 to receive power (e.g., direct current DC) and radio frequency (RF) signals.

To couple to the TOSA housing 15, each TO can laser package 12 includes a separate welding cap 13. During manufacturing, the welding cap 13 may be coupled to the TO can header 17, e.g., via welding, adhesive or other suitable approach. The welding cap 13 may then be may be welded to the TOSA housing 15 via welding ring 14, and "hammered" or otherwise adjusted during alignment procedures to ensure nominal optical performance of each TO can laser package 12. As optical transceiver modules continue to scale (e.g., to comport with small form-factor (SFF) standards and requirements), the reduced tolerances make attachment and alignment of such multi-piece TO can laser packages 12 more complex and error prone. For example, the TOSA 10 shown in FIG. 1 may measure 10 millimeters, or less, in length from end to end.

Unfortunately, TO can laser packages having multiple pieces, such as the TO can laser packages 12 shown in FIG. 1 that include a separate TO can header 17 and welding cap 13, significantly increase manufacturing time and reduce yield as even minor misalignment (e.g., a few microns) of one or more pieces may significantly reduce optical performance. Moreover, thermal conductivity between multiple separate pieces of each TO can laser package is reduced due to interface imperfections and potentially different thermal conductivities associated with the particular materials chosen for each piece. Stated differently, the TO can laser packages 12 may dissipate heat in a manner that supports relatively low-speed transmission, e.g., about 1-10 gb/s per TO can laser package, but may not adequately dissipate heat when driven to produce WDM signals in excess of 25 gb/s or more per TO can laser package, which may result in reduced component lifespan and degraded transmission performance.

An additional consideration of particular importance is the length of travel, also known as propagation delay or flight time, for RF signals from LD driver circuitry to laser diodes, and the impedances of various components such as the FPCs 11 and the pins 13 that carry RF signals. At RF signaling rates to generate WDM signals at 25 gb/s or more per laser diode, for example, every millimeter of distance between a laser diode and associated driver circuitry can negatively impact performance of the TOSA 10. In addition, impedance values must be substantially similar for each component that couples a laser diode to associated driver and power circuitry, e.g., pins 13 and FPC 11, to ensure nominal RF performance, which may further increase manufacturing costs and further complicate design and manufacture of high-speed transceiver modules and transmitters.

Thus, in accordance with an embodiment of the present disclosure, a transmitter optical subassembly (TOSA) module is disclosed with a base portion that provides one or more mounting surfaces to mount a laser diode and associated driver circuitry in close proximity of each other to allow for direct coupling without the use of an intermediate interconnect device, such as a FPC or other interconnect device. Direct coupling, as referred to herein, generally refers to a coupling between components around 20 to 100 µm and is without bends, e.g., substantially straight, and does not require an intermediate device such as a flexible printed circuit board (FPC). One example of direct coupling includes wire bonding, although other approaches to direct electrical interconnection of components is within the scope of this disclosure.

In more detail, the base of the TOSA module further includes a cylindrical shaped portion with a cavity/passageway extending therethrough. The cylindrical shaped portion may also be accurately described as an annular ring. The passageway of the cylindrical shaped base includes at least one substantially flat surface extending from a first end to a second end of the base to provide at least a portion of the one or more mounting surfaces. The base further includes a first flange that extends from a first end of the cylindrically shaped portion and a second flange that extends from a second end of the cylindrically shaped portion, with the first and second flange providing an optical coupling end and an electrical coupling end, respectively. The first and second flanges include profiles that do not increase the overall width of the TOSA module, and thus, the width of the TOSA module base remains constant along its entire length, although in other embodiments the base may taper at one or both ends depending on a desired configuration.

Continuing on, each of the optical and electrical coupling ends provide at least a portion of the one or more mounting surfaces. In some cases, the one or more mounting surfaces are co-planar such that a single, substantially-flat mounting surface extends from the optical coupling end to the electrical coupling end of the TOSA module. However, the one or more mounting surfaces may not necessarily be coplanar or provide one continuous surface. In any event, a laser diode (LD) sub-mount couples to a mounting surface adjacent the optical coupling end. A laser diode and photodiode mount on the LD sub-mount. A LD driver sub-mount couples to the mounting surface adjacent the LD sub-mount, with the LD driver sub-mount extending at least partially through the passageway towards the electrical coupling end. The LD driver sub-mount provides traces adjacent the electrical coupling end for coupling to a transmit connecting circuit, for example. The LD driver sub-mount is offset from the LD sub-mount to provide a gap, e.g., an air gap, of about 20 to 100 µm. The gap may, in a general sense, isolate the LD driver sub-mount and LD sub-mount such that heat is not directly conducted therebetween. Instead, heat conducts through the TOSA module body and then through a TOSA housing which the TOSA module is coupled to. However, the LD driver sub-mount and LD sub-mount remain in relative close proximity to allow for wire bonding or other suitable direct interconnection approaches to be used for direct coupling.

The TOSA module of the present disclosure provides significant advantageous over other approaches to TOSA modules, such as the TO can laser packages 12 discussed above with reference to FIG. 1. For example, the cylindrical shape of the TOSA module allows the same to directly align with and couple to, for example, a TOSA housing without the use of an intermediate device such as a welding cap, which reduces complexity during manufacturing, reduces alignment errors, and increases manufacturing tolerances. The body of the TOSA module may be formed from a single piece, e.g., from a metal, alloy or other suitably rigid material. The TOSA module may therefore be described as having a unibody design. The unibody design may significantly reduce alignment and coupling complexities during manufacturing of a TOSA or other transmitter. The unibody design also allows for efficient heat dissipation as a TOSA base includes a constant thermal conductivity K throughout (e.g., by virtue of the unibody construction), which provides significant advantages over other multi-piece approaches to TOSA modules, e.g., as discussed above with regard to the TO can laser packages 12 of FIG. 1.

The TOSA module further allows a laser diode to mount in close proximity to an associated LD driver circuit, which allows for direct electrical coupling between the two via wire bonding, for example. This direct coupling reduces flight time an RF signal to ensure nominal performance while also reducing or otherwise eliminating complexities and considerations that characterize other TOSA approaches that interconnect laser diodes and associated driver circuitry via, for example, pins and FPCs as discussed above with regard to FIG. 1.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T course wavelength division multiplexing (CWDM) or dense wavelength division multiplexing (DWDM) grid. As used herein, "mounted" refers to physically attaching two structures together, for example, by welding or using an epoxy or other substance or device for attachment. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. Likewise, the term "directly optically coupled" as used herein refers any optical connection that allows light to be imparted from one element to another without the use of an intermediate device such as a fiber. As used herein, "directly aligned" refers to an alignment between optical components that allows light to pass from one optical component to another optical component without changing the linear path of the light, for example, without using an optical fiber.

Example Optical Transceiver System

Figure 2:
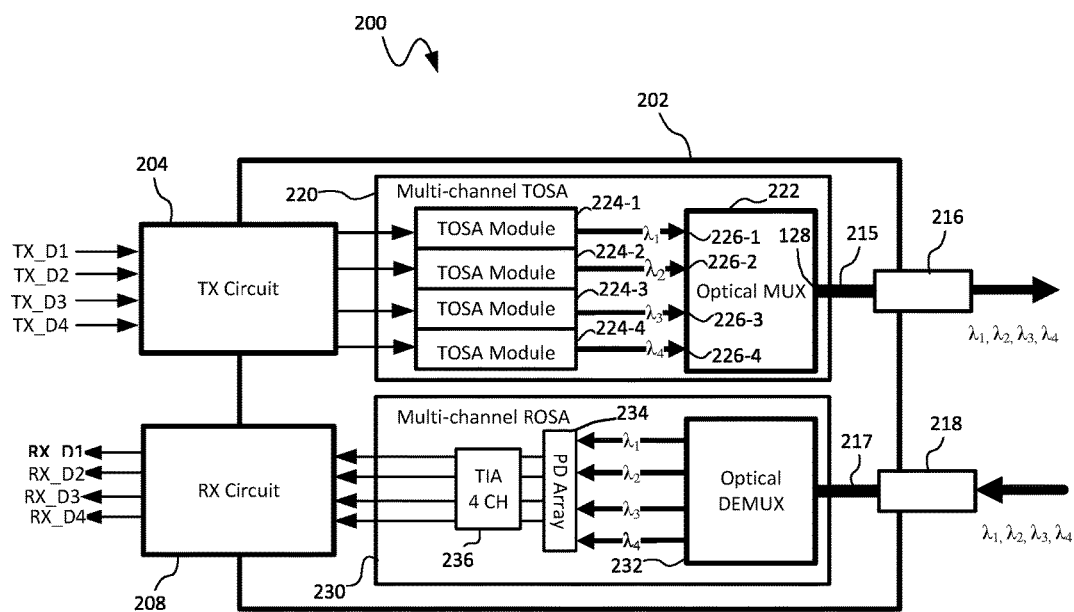
FIG. 2 is a schematic diagram of a multi-channel optical transceiver including a multi-channel transmitter optical sub-assembly (TOSA) and multi-channel receiver optical sub-assembly (ROSA), consistent with embodiments of the present disclosure.

Referring to FIG. 2, an optical transceiver 200, consistent with embodiments of the present disclosure, is shown and described. In this embodiment, the optical transceiver 200 transmits and receives four (4) channels using four different channel wavelengths ($\lambda_1$, $\lambda_2$, $\lambda_3$, $\lambda_4$) and may be configured for coarse wavelength division multiplexing (CWDM), although other numbers of channels are possible and within the scope of this disclosure. In one example, the channel wavelengths $\lambda_1$, $\lambda_2$, $\lambda_3$, $\lambda_4$ may be about 1270 nm, 1290 nm, 1310 nm, and 1330 nm, respectively. The optical transceiver 200 may be capable of transmission rates of at least about 25 Gbps per channel. The optical transceiver 200 may also be capable of both short transmission distances of tens of meters, for example, to distances of 2 kilometers or more. The optical transceiver 200 may be used, for example, in internet data center applications or fiber to the home (FTTH) applications.

In an embodiment, the optical transceiver 200 implements a Quad Small Form-Factor Plugging (QSFP) transceiver. For example, the optical transceiver 200 may be implemented within a QSFP receiver that comports with the "SFF Committee Specification SFF-8665 for QSFP+28 Gb/s 4× Pluggable Transceiver Solution (QSFP28)" published on May 10, 2013. The aspects and embodiments disclosed herein may be used within other transceiver types and is not necessarily limited to QSFP or QFSP+ transceivers.

The optical transceiver 200 includes a multi-channel transmitter optical subassembly (TOSA) 220 for transmitting optical signals on the channel wavelengths (e.g., $\lambda_1$, $\lambda_2$, $\lambda_3$, $\lambda_4$) and a multi-channel receiver optical subassembly (ROSA) 230 for receiving optical signals on the channel wavelengths (e.g., $\lambda_1$, $\lambda_2$, $\lambda_3$, $\lambda_4$). The multi-channel TOSA 220 and the multi-channel ROSA 230 are located in a transceiver housing 202. A transmit connecting circuit 204 and a receive connecting circuit 208 provide electrical connections to the multi-channel TOSA 220 and the multi-channel ROSA 230, respectively, within the housing 202. The transmit connecting circuit 204 is electrically connected to the electronic components (e.g., the lasers, monitor photodiodes, etc.) in the multi-channel TOSA 220 and the receive connecting circuit 208 is electrically connected to the electronic components (e.g., the photodiodes, the TIA, etc.) in the multi-channel ROSA 230. The transmit connecting circuit 204 and the receive connecting circuit 208 include at least conductive paths to provide electrical connections and may also include additional circuitry. The transmit connecting circuit 204 and the receive connecting circuit 208 may communicate with external systems via a data bus, such as a 38-pin connector that comports with physical connector QSFP standards and data communication protocols.

In this embodiment, the TOSA 220 includes a plurality of TOSA modules 224-1 to 224-4 optically coupled to an optical multiplexer 222 having mux input ports 226-1 to 226-4, with each of the mux input ports 226-1 to 226-4 being located on a same side, and mux output port 228, as described in greater detail below. The TOSA modules 224-1 to 224-4 may be coupled to the mux input ports 222-1 to 222-4 of the optical multiplexer 222 directly. The optical multiplexer 222 may include a filter arrangement designed to combine channel wavelengths into a WDM signal, for example. Some such example optical multiplexers include an arrayed waveguide grating (AWG) or reversed PLC splitter, for example. The TOSA modules 224-1 to 224-4 generate optical signals at different respective channel wavelengths (e.g., $\lambda 1$, $\lambda 2$, $\lambda 3$, $\lambda 4$) and the optical multiplexer 222 combines or multiplexes those optical signals to provide a multiplexed optical signal on the mux output port 228 coupled to an output optical fiber 215. The output optical fiber 215 is coupled to an output optical connector 216, such as an LC connector.

Each of the TOSA modules 224-1 to 224-4 may have a coaxial configuration such that the TOSA module is electrically connected at one end to conductive paths on the transmit connecting circuit 204 and optically coupled at the other end. Each of the TOSA modules 224-1 to 224-4 may include a laser for generating laser light at the assigned channel wavelength and optics for coupling the laser light into the respective mux input ports 226-1 to 226-4 of the optical multiplexer 222. The lasers in the TOSA modules 224-1 to 224-4 thus convert electrical data signals (TX_D1 to TX_D4) received via the transmit connecting circuit 204 into modulated optical signals coupled into the optical multiplexer 222. The lasers may include, for example, distributed feedback (DFB) lasers with diffraction gratings. Each of the TOSA modules 224-1 to 224-4 may also include a monitor photodiode for monitoring the light emitted by the lasers. Each of the TOSA modules 224-1 to 224-4 may further include one or more temperature control devices, such as a resistive heater and/or a thermoelectric cooler (TEC), for controlling a temperature of the lasers, for example, to control or stabilize the laser wavelengths.

In this embodiment, the multi-channel ROSA 230 includes an optical demultiplexer 232 coupled to a photodetector array 234 including, for example, photodiodes. The optical demultiplexer 232 demultiplexes or separates a multiplexed optical signal received on an input optical fiber 217 to provide received optical signals at different channel wavelengths, which are detected by respective photodetectors in the photodetector array 234. The input optical fiber 217 is coupled to an input optical connector 218, such as an LC connector. The multi-channel ROSA 230 also includes a multi-channel transimpedance amplifier 236 electrically connected to the photodetector array 234. The photodetector array 234 and the transimpedance amplifier 236 detect and convert optical signals received from the optical demultiplexer 232 into electrical data signals (RX_D1 to RX_D4) that are output via the receive connecting circuit 208. Although one example of the multi-channel ROSA 230 is described, the optical transceivers 200 may include other types or embodiments of ROSAs.

Figure 3A:
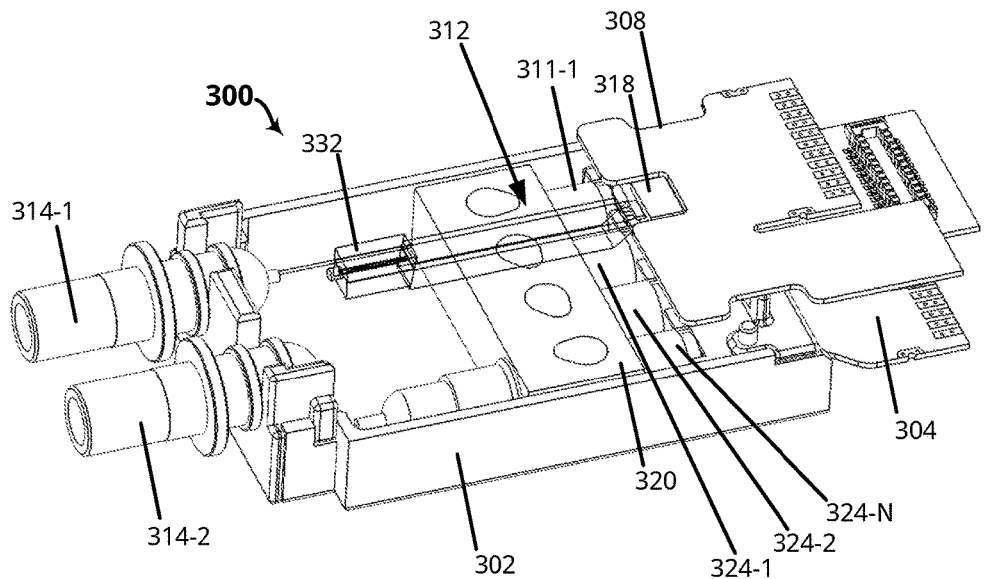
FIG. 3A is a perspective view of the multi-channel optical transceiver of FIG. 2 implemented as a small-form factor pluggable transceiver, in accordance with an embodiment of the present disclosure.

Referring to FIG. 3A, the optical transceiver 200 is shown as an optical transceiver 300 implementing the QSFP+ specification, or other applicable pluggable small-form factor specification. To this end, and in an embodiment, the optical transceiver 300 may be compliant with the QSFP28 MSA standard, and may include physical dimensions that conform to the SFF-8661 specification. In other cases, the optical transceiver 300 may implement the C form-factor pluggable (CFP) standard. In any such cases, the optical transceiver 300 may be configured to transmit and receive at a line rate of at least 100 Gb/s, respectively. This may be particularly advantageous when using the optical transceiver in, for example, a 100GBASE-LR4 application, per the IEEE 802.3bx standards.

The optical transceiver 300 includes a transceiver housing 302 and a multi-channel TOSA arrangement 320 disposed within a region of the transceiver housing 302. The multi-channel TOSA arrangement 320 includes a plurality TOSA modules 311-1 to 311-N configured to generate associated channel wavelengths and associated circuitry, which are discussed in further detail below. The multi-channel TOSA arrangement 320 electrically couples to the transmit connecting circuit 304 and also couples to an optical interface port 314-1 of the transceiver housing 302 by way of a waveguide device such as an optical fiber (not shown). The transmit connecting circuit 304 may be implemented as a printed circuit board (PCB) or any other suitable substrate for supporting the transmit connecting circuit 304.

The plurality of TOSA modules 324-1 to 324-N may each includes, for example, distributed feedback (DFB) laser diode package. Other laser types are also within the scope of this disclosure such as, for example, other directly modulated laser (DML) diodes and TO can-type laser diodes. The particular laser type chosen may be based on a desired application. For instance, applications that require long-distance, e.g., about 10 km or greater, may favor EML lasers. Conversely, applications requiring shorter distances may use DMLs. In any event, and in accordance with an embodiment, each of the TOSA modules 324-1 to 324-N of the multi-channel TOSA arrangement 320 can be configured to transmit at about 25 Gb/s, or greater. Each laser package 311-1 to 311-N of the multi-channel TOSA arrangement 320 may provide a relatively narrow spectrum of channel wavelengths such as a single channel wavelength, or may be configured to provide a broad spectrum of channel wavelengths based on associated optics. In an embodiment, the lasers can provide center wavelengths 375 nm to 1650 nm, for example. The TOSA modules 324-1 to 324-N are discussed in greater detail further below.

The optical transceiver 300 further includes a multi-channel ROSA arrangement 312 disposed within a region of the transceiver housing 302. The multi-channel ROSA arrangement 312 may include an optical demultiplexing device 332. The optical demultiplexing device 332 may comprise an arrayed waveguide grating (AWG) device, for example. The ROSA arrangement 312 electrically is coupled to a receive connecting circuit 308, and optically coupled to an optical interface receptacle 314-2 at an end of the transceiver housing 302 by way of a waveguide device such as an optical fiber (not shown). The receive connecting circuit 308 may be configured as a PCB, for example, although other embodiments are within the scope of this disclosure. The multi-channel ROSA arrangement 312 may use the detectors and the associated circuitry 318 (e.g., a TIA) to detect, amplify and convert de-multiplexed channel wavelengths and may provide the same as electrical data signals, e.g., RX_D1 to RX_D4.

Figure 3B:
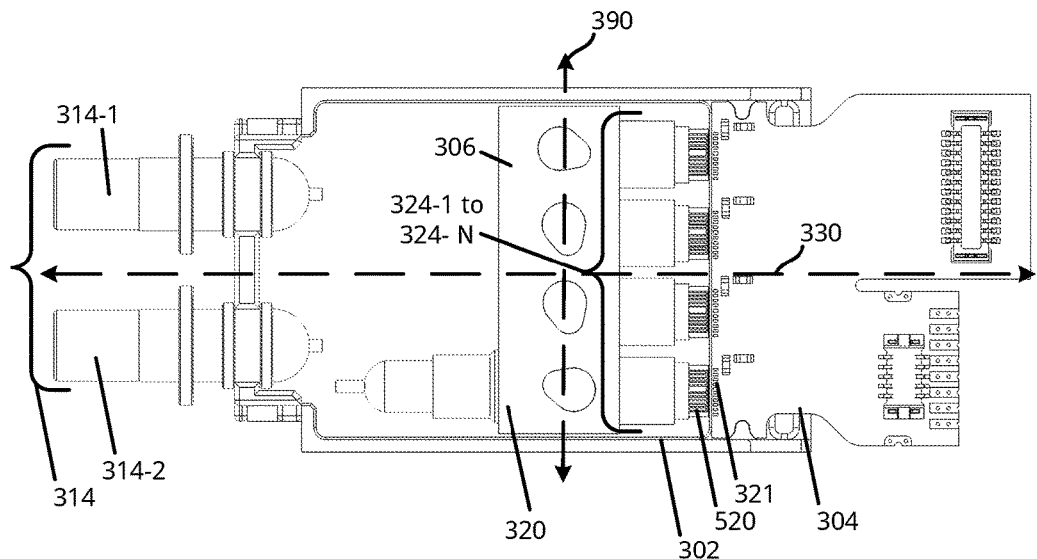
FIG. 3B is a top plan view of the multi-channel optical transceiver of FIG. 3A, in accordance with an embodiment of the present disclosures.

Turning to FIG. 3B, a top plan view of the optical transceiver 300 is shown in accordance with an embodiment of the present disclosure. For the purpose of clarity and practicality, FIG. 3B omits the multi-channel ROSA arrangement 312. As shown, the multi-channel TOSA 320 is shown in a perpendicular orientation relative to the longitudinal axis 330 of the transceiver housing 302. In more detail, the multi-channel TOSA 320 includes a housing 306 defined by a plurality of sidewalls 406-1 to 406-6, which are shown and described greater detail below with regard to FIG. 4A. The housing 306 of the multi-channel TOSA 320 is disposed adjacent to the transmit connecting circuit 304.

Figure 4A:
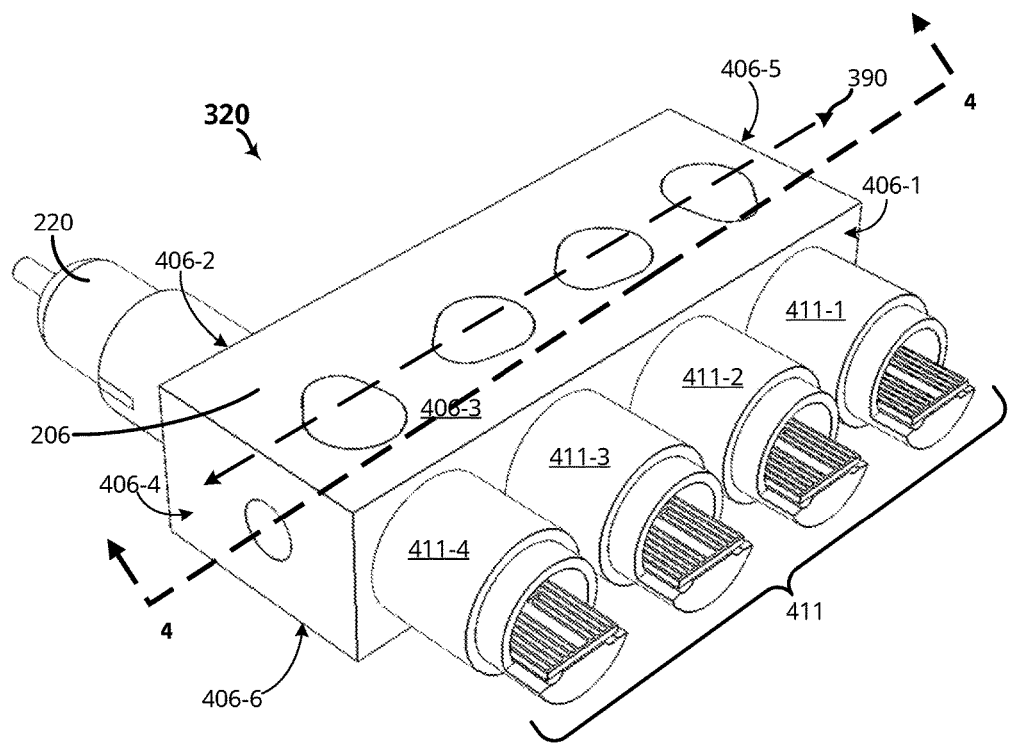
FIG. 4A is a perspective view of a multi-channel optical transmitter including a plurality of TOSA modules in accordance with an embodiment of the present disclosure.

Turning to FIG. 4A, the multi-channel TOSA 320 is shown isolated from the optical transceiver 300 for the purposes of clarity and practicality. In an embodiment, the multi-channel TOSA 320 may include a plurality of sidewalls 406-1 to 406-6, which may also be referred to as a first sidewall 406-1, a second sidewall 406-2, a third sidewall 406-3, a fourth sidewall 406-4, a fifth sidewall 406-5 and a sixth sidewall 406-6, respectively. The first and second sidewalls 406-1 and 406-2 are disposed opposite each other with at least the third sidewall 406-3 adjoining the two. The fourth and fifth sidewalls 406-4 and 406-5 define a first and second end, respectively, with the first and second sidewalls 406-1 and 406-2 extending between the two along the longitudinal center line 390.

Figure 4B:
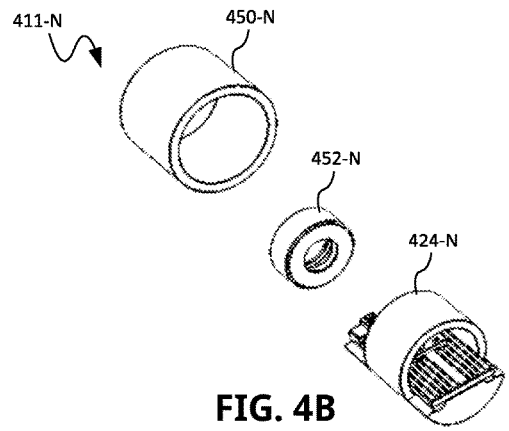
FIG. 4B is an exploded view of a TOSA module in accordance with an embodiment of the present disclosure.

In this embodiment, the first sidewall 406-1 may include the plurality of laser assemblies collectively indicated at 411 and individually indicated as laser assemblies 411-1 to 411-4. FIG. 4B shows an example laser assembly 411-N in an exploded view in accordance with an embodiment of the present disclosure. As shown, the laser assembly 411-N includes a welding ring 450-N or z-ring 450-N, a collimating lens 452-N and a TOSA module 424-N. The welding ring 450-N may be integral to the body of the multi-channel TOSA 320, e.g., formed as a single piece, or may be separate pieces as shown. The welding ring 450-N may be attached to a respective input port of the multi-channel TOSA 320 to allow the TOSA module 424-N to properly align and couple to the multi-channel TOSA 320. As discussed below, the body of the TOSA module 424-N may have a cylindrical shape to allow the same to be easily inserted into an associated welding ring 450-N for mounting to the TOSA housing 406 without the use of an intermediate welding device such as a welding cap. The TOSA module 424-N may be concentric with the welding ring 450-N when attached to the TOSA housing, as shown.

Figure 4C:
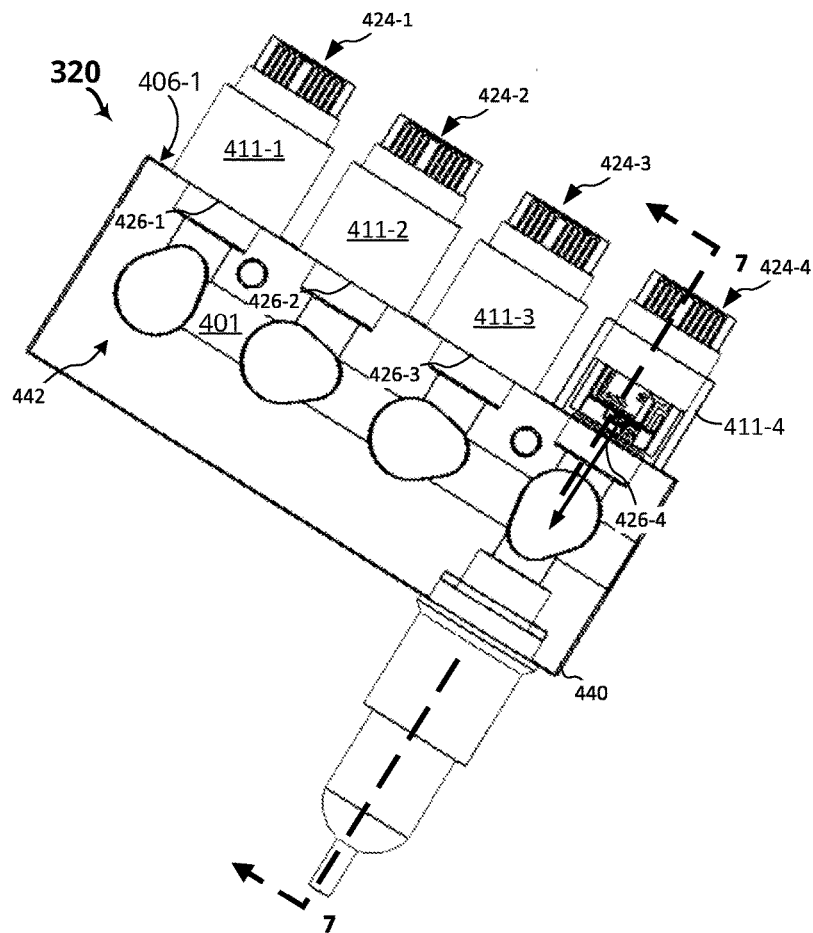
FIG. 4C is a cross-sectional top view of the multi-channel optical transmitter shown in FIG. 4A taken along line 4-4.
Figure 4D:
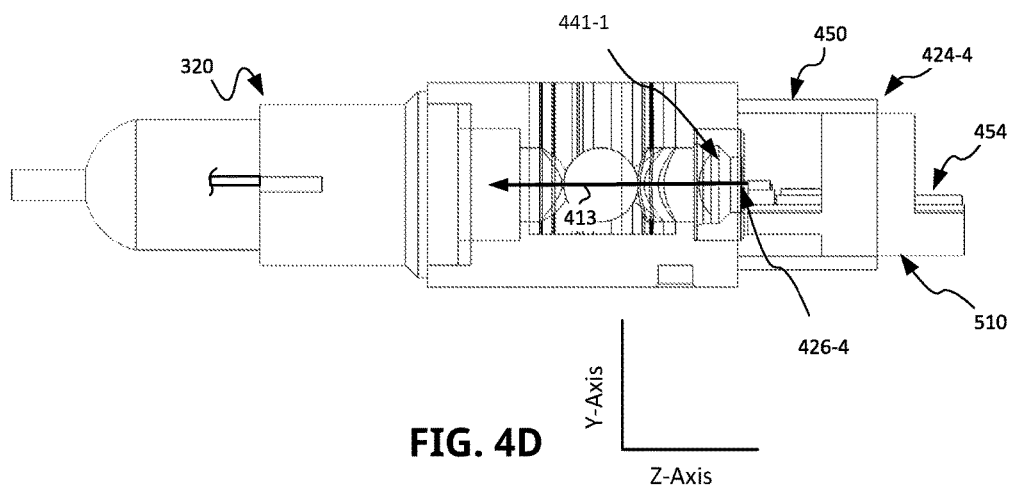
FIG. 4D is a cross-sectional side view of the multi-channel optical transmitter shown in FIG. 4B taken along line 7-7.

Referring to FIGS. 4C and 4D, an embodiment of a multi-channel transmitter 332 may include a plurality of TOSA modules 424-1 to 424-4 optically coupled to and directly aligned with mux input ports 426-1 to 426-4 of the multi-channel TOSA 320. The multi-channel TOSA 320 may be used, for example, as the multiplexing device 222 in the multi-channel transceiver 200 shown in FIG. 2 or may be used separately as a transmitter. Although four (4) TOSA modules 424-1 to 424-4 are shown to support four (4) channels, other numbers of TOSA modules and channels are within the scope of the present disclosure.

In this embodiment, the multi-channel TOSA 320 includes a multiplexer housing 440 with a cavity 401 configured to receive an optical multiplexing arrangement 442. The multiplexer housing 440 may be further configured to receive the TOSA modules 424-1 to 424-4, which are shown as mounted to the multiplexer housing 440. The multiplexer housing 440 includes at least one side wall 406-1 and a plurality of mux input ports 426-1 to 426 through the side wall 406-1. The TOSA modules 424-1 to 424-4 are optically coupled to and are directly aligned with the respective mux input ports 426-1 to 426-4 through the respective input apertures of the sidewall 406-1, e.g., aperture 441-4 shown more clearly in FIG. 4D.

When directly aligned, as shown in FIG. 4D, a laser output 413 from a TOSA module 424-4 passes into the mux input port 426-4 without using an optical fiber or other optical component to change the path of the laser output 413. The TOSA 320 is designed such that the mux input ports 426-1 to 426-4 are spaced sufficiently to allow the multiple TOSA modules 424-1 to 424-4 to be mounted side-by-side on the side wall 406-1 and directly aligned with the mux input ports 426-1 to 426-4. The input apertures of the TOSA 432 may thus have the same spacing, center-to-center, to align with the mux input ports 426-1 to 426-4. In one example, the mux input ports 426-1 to 426-4 may be spaced about 3.25 mm, for example.

Figure 5A:
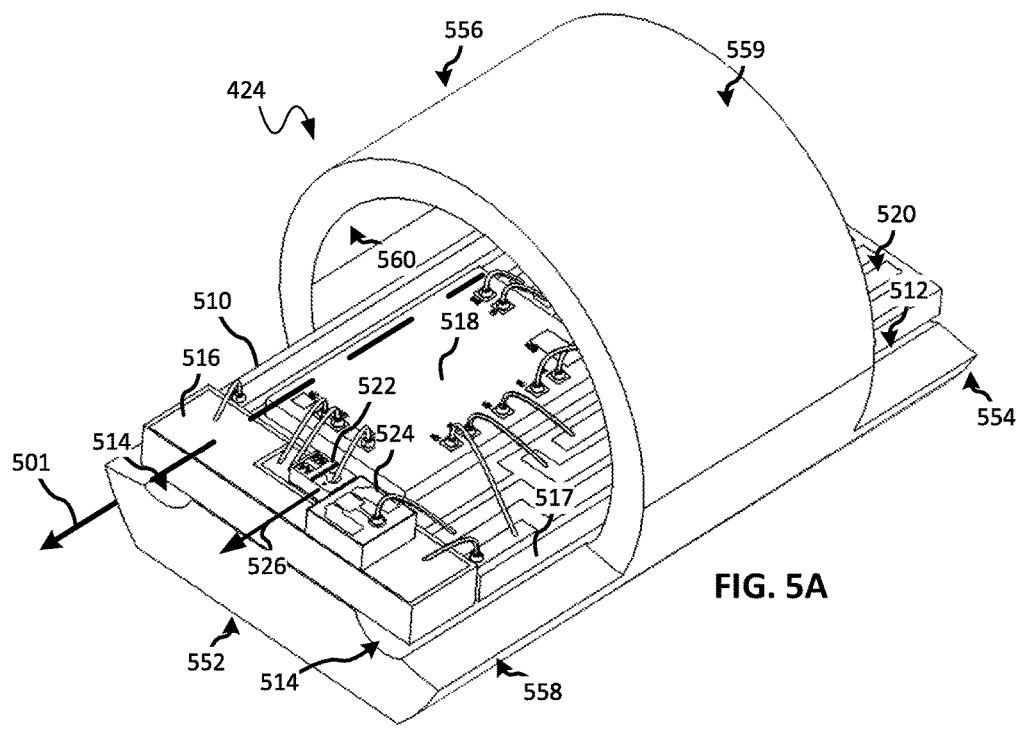
FIG. 5A is a perspective view of a TOSA module used in the multi-channel transmitter shown in FIG. 4A, consistent with embodiments of the present disclosure.
Figure 5B:
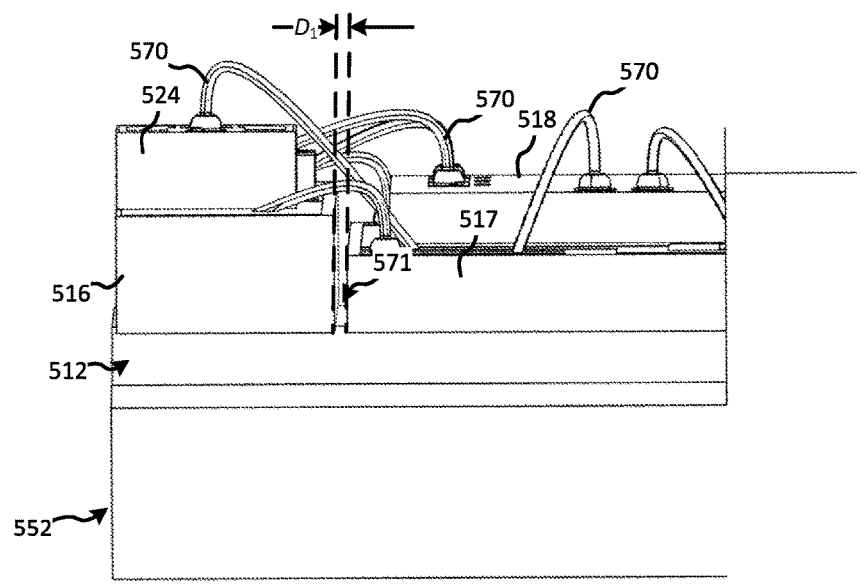
FIG. 5B shows an enlarged partial side view of the TOSA module shown in FIG. 5A.

In the illustrated embodiment, Z-rings, e.g., Z-ring 450, are used to mount the TOSA modules 424-1 to 424-4 to the side wall 406-1 of the TOSA housing 440 and to facilitate alignment of the laser output from the TOSA modules 424-1 to 424-4 with the mux input ports 426-1 to 426-4 on the TOSA 320. As shown in FIGS. 5A-5B and described in greater detail below, each TOSA module 424-4 include a base 510, or body 510, having an optical coupling end 552 that is received inside and secured to a respective Z-ring 450. In the illustrated embodiment, the optical coupling end 552 of the base 510 is adjacent a cylindrical shaped portion 556 of the base 510 and is received in a cylindrical aperture in the Z-ring 450, although other shapes are within the scope of the present disclosure. The Z-ring 450 may be made of a metal material such as stainless steel, for example. The material of the Z-ring 450 may be the same as the material of the base 510.

Before the Z-ring 450 is secured to the optical coupling end 552 of the base 510, the TOSA module 424-4 may be aligned along the Z axis relative to the mux input port. Once aligned along the Z-axis, the Z-ring 450 may be secured, in the aligned position, to the optical coupling end 552, for example, by laser welding with a YAG laser or other suitable laser. The TOSA module 424-4 with the attached Z-ring 450, already aligned in the Z-axis, may then be aligned along the X-Y axes relative to the mux input port 426-4. Once aligned along the X-Y axes, the Z-ring 450 may be secured to the side wall 406-1, for example, using laser welding with a YAG laser or other suitable laser. Laser welding allows the TOSA module 424-4 to be re-aligned or re-hammered later, if necessary, by softening the weld with the laser and adjusting the coupling position to the desired power.

The TOSA housing 440 may be made of a metal material, such as stainless steel, or other suitable material. In some cases, the TOSA housing 440, Z-ring 450 and the base 510 of the TOSA module 424-4 comprise the same metal or alloy, such as stainless steel, copper, aluminum, for example.

FIG. 5A shows an example TOSA module 424 in greater detail. The base 510 includes an electrical coupling end 554 disposed opposite the optical coupling end 552 and walls 558 between the optical coupling end 552 and the electrical coupling end 554 along longitudinal axis 501. The base 510 includes a cylindrical region 556, with the cylindrical region 556 having an outer surface 559 and an inner surface 560 disposed opposite the outer surface 559. As shown in FIG. 5D, the cylindrical region 559 provides the base 510 with a substantially cylindrical shape that allows the TOSA module 424 to be coupled, e.g., via welds, to an associated Z-ring during manufacturing, as discussed above. The base 510 may also include notches/channels 514 adjacent to the mounting region 512 and also extending substantially along the longitudinal axis 501.

Figure 5C:
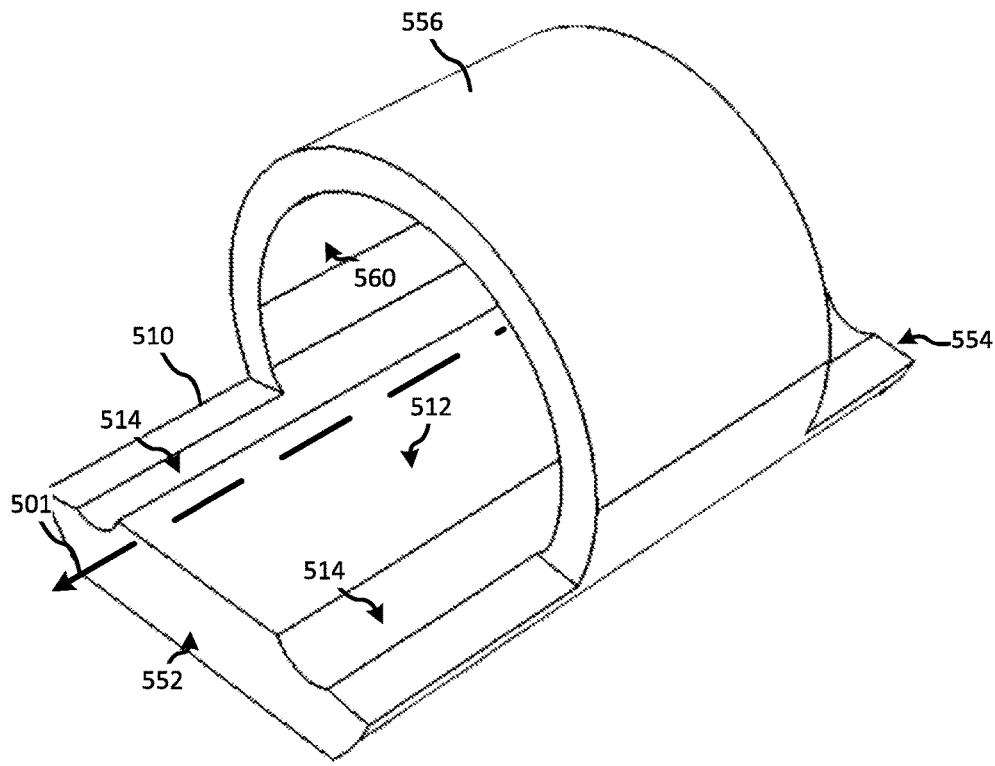
FIG. 5C is another perspective view of a TOSA module used in the multi-channel transmitter shown in FIG. 4A, consistent with embodiments of the present disclosure.
Figure 5D:
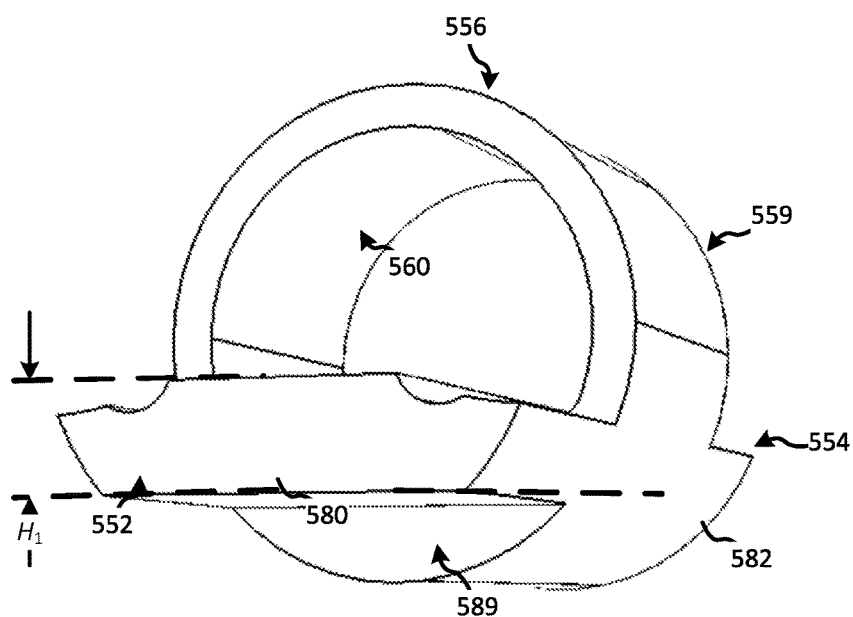
FIG. 5D is yet another perspective view of a TOSA module used in the multi-channel transmitter shown in FIG. 4A, consistent with embodiments of the present disclosure.

The base 510 further includes a mounting region 512, with the mounting region 512 including at least one substantially planar mounting surface that extends along the longitudinal axis 501, which is shown more clearly in FIG. 5C. The mounting region receives and couples to surface mount optical devices and circuitry, which are described in greater detail below.

Referring to FIGS. 5C and 5D, the body 510 includes a first flange 580 and a second flange 582, with the first and second flange extending in parallel along the longitudinal axis 501. The first flange 580 defines a tapered portion having an overall height of $H_1$, with $H_1$ measuring about 0.48 mm. The first flange 580 may be formed by, for example, removing a portion of the body 510 generally indicated at 589. As shown, the first flange 580 defines the optical coupling end 552 and the second flange 582 defines the electrical coupling end 554. The first and second flanges 580 and 582 include profiles that do not increase the overall width of the body 510, and thus, the width of the body 510 remains constant along its entire length, although in other embodiments the body 510 may taper at one or both ends width-wise depending on a desired configuration.

Returning to FIGS. 5A and 5B, with additional reference to FIG. 5C, the laser diode 522 and monitor photodiode 524 are mounted on a diode sub-mount 516, and the laser driver circuitry 518 is mounted on a laser driver sub-mount 517 including conductive paths or traces, e.g., paths 520, for providing electrical connections. The diode sub-mount 516 and laser driver sub-mount 517 may comprise a printed circuit board (PCB) or other suitable substrate. The inner surface 560 of the cylindrical region 559 may act, essentially, as a stop to prevent lateral movement of the laser driver sub-mount 517. The laser driver sub-mount 517 may extend at least partially through a passageway of the cylindrical region, with the passageway having a semi-cylindrical shape. In some cases, such as shown, the laser driver sub-mount 517 may extend out from the cylindrical region 556 towards the electrical coupling end 554, as shown. Therefore, when a TOSA module is coupled to a TOSA and disposed in a housing, the traces 520 may be disposed in close proximity to allow for direct coupling with transmit circuitry. For example, as shown in FIG. 3B, the traces 520 are disposed 20 to 100 μm of the transmit connecting circuit 304, thus allowing for direct coupling, e.g., using wire bonding, between the traces 520 and the pads 321 of the transmit connecting circuit.

The laser diode 522 may be configured to emit a single channel wavelength, e.g., 1270 nm, 1290 nm, 1310 nm, or 1330 nm, generally along direction 526 towards the TOSA 320, for example. Other TOSA modules having different configurations are also within the scope of this disclosure. Optical signals at different channel wavelengths (e.g., $\lambda 1$, $\lambda 2$, $\lambda 3$, $\lambda 4$) may thus be coupled into the respective ports 226-1 to 226-4 of the optical mux 222 (FIG. 1) via respective TOSA modules 224-1 to 224-4. The optical mux 222 may then generate a multiplexed optical signal combining the channel wavelengths and output the same from the port 228.

Referring to FIG. 5B, with additional reference to FIG. 5A, the laser diode 522 and monitor photodiode 524 and diode sub-mount 516 may be mounted in a sandwich fashion to the mounting region 512, and more particularly, to a surface thereof. Likewise, the laser driver circuitry 518 and laser driver sub-mount 517 may also be mounted in a sandwich fashion with a surface of the mounting region 512. Accordingly, the laser diode 522, monitor photodiode 524, and laser driver sub-mount 517 may thermally conduct heat to the base 510 during operation. The base 510 may comprise any material that provides suitable thermal conductivity, such as copper, aluminum, or any metal/alloy having a desired thermal conductivity. The base 510 may be formed from a single piece to ensure optimal thermal conductivity, or may be formed from multiple pieces of a same or different material. An associated Z-ring, e.g., Z-ring 450-N, and the TOSA housing 306 may comprise an identical material, or material having substantially similar thermal conductivity, to that of the base 510 to allow heat to dissipate during operation. For example, each of the base 510, Z-ring 350-N and TOSA housing 306 may comprise copper, aluminum, brass, steel, bronze, or an alloy thereof.

Referring to FIG. 5B, the laser driver circuitry 518 and laser driver sub-mount 517 may be separated by a gap 571 from the laser diode 522, monitor photodiode 524 and diode sub-mount 516. The gap 571 may measure a distance $D_1$, with distance D1 measuring about 0.1 to 1.0 mm, depending on a desired configuration. The gap 571 may comprise air or another material such as a gel. The gap 571 may be generally uniform in distance such as shown, but this disclosure is not necessarily limited in this regard. In any event, the gap 571 may advantageously prevent heat from the laser driver circuitry 518 from directly conducting onto the laser diode 522 and monitor photodiode 524, and vice-versa. The gap 571 may be sized to allow for wire bonding 570 to extend across the gap 571 to electrically couple the laser driver circuitry 518 to the laser diode 522 and the monitor photodiode 524 to the traces 520, for example.

Additional Example Embodiments

Consistent with an aspect of the present disclosure a multi-channel transceiver is disclosed. The multi-channel transceiver including a transceiver housing, a plurality of transmitter optical subassembly (TOSA) modules for transmitting a plurality of optical signals at different respective channel wavelengths, each of the plurality of TOSA modules comprising a base extending from a first end to a second end along a longitudinal axis, the base having a substantially cylindrical portion with a passageway extending therethrough, and wherein the base includes at least one mounting surface that extends at least partially through the passageway, and the substantially cylindrical portion provides an elliptical outer surface for coupling to a TOSA housing.

In accordance with another aspect a multi-channel transceiver is disclosed. The multi-channel transceiver including a transceiver housing, a plurality of transmitter optical subassembly (TOSA) modules for transmitting a plurality of optical signals at different respective channel wavelengths, each of the plurality of TOSA modules comprising a base extending from a first end to a second end along a longitudinal axis, the base having a substantially cylindrical portion with a passageway extending therethrough, and wherein the base includes at least one substantially flat mounting surface coupled to a laser diode and associated driving circuitry, a multi-channel receiver optical subassembly (ROSA) for receiving a multiplexed optical signal including multiple channel wavelengths, separating the channel wavelengths, and detecting optical signals at each of the channel wavelengths.

In accordance with another aspect, a multi-channel transceiver is disclosed. The multi-channel transceiver including a transceiver housing, a plurality of transmitter optical subassembly (TOSA) modules for transmitting a plurality of optical signals at different respective channel wavelengths, each of the plurality of TOSA modules comprising a base extending from a first end to a second end along a longitudinal axis, the base having a substantially cylindrical portion with a passageway extending therethrough, and wherein the base includes at least one substantially flat mounting surface coupled to a laser diode and associated driving circuitry, the laser diode coupling to the at least one mounting surface via a laser diode sub-mount, and the associated driving circuitry coupling to the at least one mounting surface via a laser driver sub-mount, a multi-channel receiver optical subassembly (ROSA) for receiving a multiplexed optical signal including multiple channel wavelengths, separating the channel wavelengths, and detecting optical signals at each of the channel wavelengths.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure, which is not to be limited except by the following claims.

What is claimed is:

1. A multi-channel transceiver comprising:
   a transceiver housing;
   a plurality of transmitter optical subassembly (TOSA) modules for transmitting a plurality of optical signals at different respective channel wavelengths, each of the plurality of TOSA modules comprising:
   a base formed from a single piece, the base extending from a first end to a second end along a longitudinal axis, the base having a substantially cylindrical portion with a passageway extending therethrough, and wherein the base includes at least one mounting surface that at least partially defines the passageway and that extends from the passageway along the longitudinal axis; and
   a laser diode mounted to the at least one mounting surface of the base.

2. The multi-channel transceiver of claim 1, wherein the first end of the base defines an electrical coupling end and the second end of the base defines an optical coupling end, and wherein the electrical coupling end and the optical coupling end extend from opposite sides of the substantially cylindrical portion of the base relative to each other.

3. The multi-channel transceiver of claim 1, wherein the passageway has a semi-cylindrical shape, the semi-cylindrical shape defined at least in part by the at least one mounting surface.

4. The multi-channel transceiver of claim 1, wherein the substantially cylindrical portion of each of the plurality of TOSA modules is disposed at least partially within a respective welding ring such that each substantially cylindrical portion is concentric with a respective welding ring, and wherein each TOSA module attaches to a multi-channel TOSA housing via the respective welding ring.

5. The multi-channel transceiver of claim 4, wherein the base comprises a first material and each welding ring comprises a second material, and wherein the first and second material have a substantially similar thermal conductivity.

6. The multi-channel transceiver of claim 5, wherein the first material comprises copper, aluminum, brass, steel, bronze, or an alloy thereof.

7. The multi-channel transceiver of claim 1, further comprising associated driving circuitry mounted to the at least one mounting surface to drive the laser diode.

8. The multi-channel transceiver of claim 7, wherein the laser diode mounts to the at least one mounting surface via a laser diode sub-mount, and wherein the associated driving circuitry mounts to the at least one mounting surface via a laser driver sub-mount.

9. The multi-channel transceiver of claim 8, wherein the laser diode sub-mount is offset on the at least one mounting surface by a distance of D from the laser driver sub-mount.

10. The multi-channel transceiver of claim 8, further comprising a transmit connecting circuit, and wherein traces of the laser driver sub-mount couple directly to the transmit connecting circuit.

11. The multi-channel transceiver of claim 7, wherein the laser diode is directly coupled to associated driving circuitry.

12. The multi-channel transceiver of claim 11, wherein the laser diode is directly coupled to associated driving circuitry via wire bonding.

13. The multi-channel transceiver of claim 1, wherein the transceiver is a Small Form-factor Pluggable (SFP) transceiver module.

14. A multi-channel optical transceiver comprising:
a transceiver housing;
a plurality of transmitter optical subassembly (TOSA) modules for transmitting a plurality of optical signals at different respective channel wavelengths, each of the plurality of TOSA modules comprising:
a base extending from a first end to a second end along a longitudinal axis, the base having a substantially cylindrical portion with a passageway extending therethrough, and wherein the base includes at least one substantially flat mounting surface coupled to a laser diode and associated driving circuitry; and
a laser driver sub-mount coupled to the at least one substantially flat mounting surface, the laser driver sub-mount having a first end and one or more traces proximate the first end to electrically couple to a transmit connecting circuit, wherein the first end of the laser driver sub-mount extends from the passageway;
a multi-channel receiver optical subassembly (ROSA) for receiving a multiplexed optical signal including multiple channel wavelengths, separating the channel wavelengths, and detecting optical signals at each of the channel wavelengths.

15. The multi-channel optical transceiver of claim 14, wherein the laser diode couples to the at least one mounting surface via a laser diode sub-mount, and wherein the associated driving circuitry couples to the at least one mounting surface via a laser driver sub-mount, and wherein the laser diode sub-mount is offset on the at least one mounting surface by a distance of D from the laser driver sub-mount.

16. The multi-channel optical transceiver of claim 14, further comprising the transmit connecting circuit, and wherein the one or more traces of the laser driver sub-mount are directly coupled to the transmit connecting circuit.

17. A transmitter optical subassembly (TOSA) module, the TOSA module comprising:
a base extending from a first end to a second end along a longitudinal axis, the base having a substantially cylindrical portion with a semi-cylindrical passageway extending therethrough;
at least one mounting surface defined at least in part by the semi-cylindrical passageway; and
a laser diode and associated driving circuitry coupled to the at least one mounting surface, wherein the laser diode is disposed outside of the semi-cylindrical passageway and the associated driving circuitry is disposed at least partially within the semi-cylindrical passageway.

18. The TOSA module of claim 17, further comprising:
a laser diode sub-mount coupled to the at least one mounting surface, wherein the laser diode couples to the at least one mounting surface via the laser diode sub-mount; and
a laser driver sub-mount coupled to the at least one mounting surface, wherein the associated driving circuitry for the laser diode is coupled to the at least one mounting surface via the laser driver sub-mount.

19. The TOSA module of claim 18, wherein the first end of the base defines an electrical coupling end for electrically coupling to a transmit connecting circuit, and wherein the laser driver sub-mount extends from the semi-cylindrical passageway towards the electrical coupling end.

20. The TOSA module of claim 17, wherein the second end of the base defines an optical coupling end for aligning and coupling channel wavelengths into a TOSA housing, and wherein the optical coupling end extends from the substantially cylindrical portion.

* * * * *